(12) United States Patent
Horikawa et al.

(10) Patent No.: US 10,041,417 B2
(45) Date of Patent: Aug. 7, 2018

(54) GAS TURBINE SYSTEM WITH INJECTION WATER PRESSURIZATION PASSAGE

(71) Applicant: KAWASAKI JUKOGYO KABUSHIKI KAISHA, Kobe-shi, Hyogo (JP)

(72) Inventors: Atsushi Horikawa, Akashi (JP); Masahide Kazari, Akashi (JP); Hiroyuki Kashihara, Kobe (JP); Junichi Kitajima, Akashi (JP)

(73) Assignee: KAWASAKI JUKOGYO KABUSHIKI KAISHA, Chuo-ku, Kobe-shi (JP)

( * ) Notice: Subject to any disclaimer, the term of this patent is extended or adjusted under 35 U.S.C. 154(b) by 901 days.

(21) Appl. No.: 14/355,774

(22) PCT Filed: Oct. 29, 2012

(86) PCT No.: PCT/JP2012/077849
§ 371 (c)(1),
(2) Date: May 1, 2014

(87) PCT Pub. No.: WO2013/065624
PCT Pub. Date: May 10, 2013

(65) Prior Publication Data
US 2014/0283498 A1    Sep. 25, 2014

(30) Foreign Application Priority Data

Nov. 2, 2011    (JP) .................................. 2011-240818

(51) Int. Cl.
*F02C 3/30*    (2006.01)
*F02C 9/40*    (2006.01)
(Continued)

(52) U.S. Cl.
CPC ................... *F02C 9/40* (2013.01); *F02C 3/22* (2013.01); *F02C 3/30* (2013.01); *F02C 3/305* (2013.01);
(Continued)

(58) Field of Classification Search
CPC .......... F01K 21/04; F01K 21/047; F02C 3/20; F02C 7/12; F02C 7/1435; F02C 3/30; F02C 3/305; F23D 17/002
See application file for complete search history.

(56) References Cited

U.S. PATENT DOCUMENTS 3,736,745 A * 6/1973 Karig .................... F01K 25/005
60/279
5,323,604 A * 6/1994 Ekstedt .................... F23R 3/34
60/747

(Continued)

FOREIGN PATENT DOCUMENTS

| EP | 2299178 A1 | 3/2011 |
|---|---|---|
| JP | 10-176504 A | 6/1998 |

(Continued)

OTHER PUBLICATIONS

Communication dated Mar. 31, 2015 from the European Patent Office in counterpart application No. 12846297.5.
(Continued)

*Primary Examiner* — Gerald L Sung
*Assistant Examiner* — Marc Amar
(74) *Attorney, Agent, or Firm* — Sughrue Mion, PLLC

(57) ABSTRACT

The gas turbine system (GT) includes a combustor (2) having a fuel injection nozzle assembly (4) for jetting hydrogen gas (H) and pure water (W), a reservoir (12) for pooling the pure water (W) to be supplied to the combustor (2), a gas compressing device (10) for boosting the hydrogen gas (H) to be supplied to the combustor (2), a fuel supply
(Continued)

passage (6) for guiding the boosted hydrogen gas (H) towards the combustor (2), and a pressurizing passage (16) communicating between the reservoir (12) and the fuel supply passage (6) for pressurizing the pure water (W) by means of the boosted hydrogen gas (H).

5 Claims, 6 Drawing Sheets

(51) Int. Cl.
| | |
|---|---|
| *F02C 7/143* | (2006.01) |
| *F02C 3/22* | (2006.01) |
| *F23L 7/00* | (2006.01) |
| *F23R 3/28* | (2006.01) |
| *F23C 99/00* | (2006.01) |

(52) U.S. Cl.
CPC .......... *F02C 7/1435* (2013.01); *F23C 99/008* (2013.01); *F23L 7/002* (2013.01); *F23R 3/283* (2013.01); *F23R 3/286* (2013.01); *F23C 2203/30* (2013.01); *F23C 2900/9901* (2013.01); *F23R 2900/00002* (2013.01)

(56) References Cited

U.S. PATENT DOCUMENTS

| | | | |
|---|---|---|---|
| 5,816,041 A | 10/1998 | Greninger | |
| 5,974,780 A * | 11/1999 | Santos | F02C 3/22 60/39.59 |
| 6,038,848 A | 3/2000 | Frutschi | |
| 7,028,485 B1 * | 4/2006 | Mee | F02C 7/04 415/116 |
| 2004/0040313 A1 * | 3/2004 | Kurokawa | F01D 25/24 60/796 |
| 2004/0079088 A1 * | 4/2004 | Hayakawa | F01K 21/047 60/784 |
| 2006/0239831 A1 | 10/2006 | Garris, Jr. | |
| 2010/0037586 A1 | 2/2010 | Gurin et al. | |
| 2010/0314878 A1 | 12/2010 | Dewitt | |

FOREIGN PATENT DOCUMENTS

| | | |
|---|---|---|
| JP | 2001-012257 A | 1/2001 |
| JP | 2001-041454 A | 2/2001 |
| JP | 2001-207861 A | 8/2001 |
| JP | 2004-278875 A | 10/2004 |
| JP | 2007-321601 A | 12/2007 |
| RU | 2009137121 A | 4/2011 |
| WO | 2008108058 A1 | 9/2008 |

OTHER PUBLICATIONS

Kudryavtsev, V.M., "Theoretical and Calculation Basis of Liquid Rocket Engines", vol. 1, Edition 4, Moscow, "Vysshaya Shkola", 1993, 5 pages.
Communication dated Jun. 28, 2016, from the Russian Patent Office in counterpart Russian application No. 2014119542.
Communication dated Apr. 22, 2015, issued by the Australian Patent Office in corresponding Australian Application No. 2012333652.
Communication dated Jun. 9, 2015, issued by the Japan Patent Office in corresponding Japanese Application No. 2011-240818.
Communication dated Jun. 23, 2015, issued by the Canadian Intellectual Property Office in corresponding Canadian Application No. 2,854,079.
Communication dated Feb. 2, 2016, from the Russian Patent Office in counterpart application No. 2014119542.
International Preliminary Report on Patentability, dated May 15, 2014. Issued by the International Searching Authority in counterpart application No. PCT/JP2012/077849.
Communication dated Mar. 29, 2017, from the Russian Patent Office in counterpart application No. 2014119542/06.

* cited by examiner

GAS TURBINE SYSTEM WITH INJECTION WATER PRESSURIZATION PASSAGE

CROSS REFERENCE TO THE RELATED APPLICATION

This application is based on and claims Convention priority to Japanese patent application No. 2011-240818, filed Nov. 2, 2011, the entire disclosure of which is herein incorporated by reference as a part of this application.

BACKGROUND OF THE INVENTION (Field of the Invention)

The present invention relates to a gas turbine system of a type in which the emission of NOx is reduced by injecting water or water vapor into a combustor.

(Description of Related Art)

In recent years, the low-level NOx emission in and the increase of the efficiency of the gas turbine engine are issues of concern. To achieve the low-level NOx emission, injection of water or water vapor into a combustor is generally practiced in the art concerned. In this connection, see, for example, the patent documents 1 and 2 listed below.

PRIOR ART LITERATURE

Patent Document 1: JP Laid-open Patent Publication No. 2001-041454

Patent Document 2: JP Laid-open Patent Publication No. 2004-278875

It has, however, been found that since in the practice of the patent documents 1 and 2 referred to above, a steam is injected into the combustor according to a pressurized injection system, it is necessary to inject the steam under a high pressure in order to supply it into the combustor at a uniform density and, accordingly, supplemental equipments such as, for example, a booster apparatus and a driving power source therefor are required. As a result, the heat efficiency of the gas turbine system as a whole is rendered to be worse.

SUMMARY OF THE INVENTION

In view of the foregoing, the present invention has been devised to provide a gas turbine system of a type in which an incidental equipment for supplying water or a water vapor is simplified to thereby reduce the NOx emission at a high efficiency.

In order to accomplish the foregoing object, the present invention provides a gas turbine system of a type including: a combustor, having a fuel injection nozzle assembly to inject a gas fuel and an injection water; a reservoir to pool the injection water to be supplied to the combustor; a fuel boosting unit to increase the pressure of the gas fuel to be supplied to the combustor; a fuel supply passage to supply the boosted gas fuel into the combustor; and a pressurizing passage communicated with the reservoir and the fuel supply passage to increase the pressure of the injection water by the aid of the boosted gas fuel.

According to the present invention, since with the use of the boosted gas fuel the injection water is pressurized, no extra equipments such as, for example, a device for pressurizing the injection water and a power device therefor is needed and, therefore, a highly efficient reduction of the NOx emission can be realized while the system as a whole is simplified.

In a preferred embodiment of the present invention, the combustor referred to above is preferably of a premixing type in which the gas fuel and the injection water are premixed. According to this structural feature, with the use of the premixing type of combustor capable of atomizing the injection water by the effect of the flow of the gas fuel, not a pressure atomizer type in which the injection water is supplied under a high pressure to atomize it, the injection pressure of the injection water can be effectively suppressed, and therefore, pressurization by the effect of the flow of the gas fuel can readily be achieved. As a result, simplification of accessory equipments and the highly efficient reduction of the NOx emission can be easily realized.

Where the premixing type is employed for the combustor, the gas fuel is preferably a hydrogen gas. As is well known to those skilled in the art, hydrogen has a low energy density per unitary volume, and, therefore, where the supply of the hydrogen in a calorie comparable with that of a natural gas is desired, hydrogen gas need be supplied in a quantity that is three to four times in volume ratio than natural gas and the flow or flow velocity of the hydrogen past a nozzle assembly must be three to four times that with the natural gas. However, according to the use of the gas fuel in the form of hydrogen as referred to above, the injection water can be atomized by the effect of the fast flow of the hydrogen and premixing of the injection water with a substantial quantity of the hydrogen gas can be accelerated. As a result thereof, it is possible to efficiently suppress the flame temperature with a minimized quantity of the injection water and, hence, a highly efficient reduction of the NOx emission can be realized.

In another preferred embodiment of the present invention, the gas turbine system of the present invention may also includes a pure water making device to manufacture the injection water in the form of a pure water. When the pure water making device is simultaneously operated during the operation of the gas turbine engine, the electric power consumption is rendered to be high. However, according to the use of the pure water making device in the gas turbine system, the pure water so prepared can be pooled in the reservoir and, therefore, it is possible to employ such an operating schedule that, for example, the purer water making device may be operated in the night, during which the electric power consumption is low, to allow a quantity of the pure water needed in one day to be pooled in the reservoir and, instead, the pure water making device may not be operated during the operation of the gas turbine engine. Accordingly, the electric power consumption can be suppressed, and also the amount of the pure water used can be saved, and, as a result, a highly efficient reduction of the NOx emission can be realized.

In a further preferred embodiment of the present invention, the fuel boosting unit may be employed in the form of a gas compressing device. Also, the fuel boosting unit referred to above may include a liquid fuel compressing device to boost the pressure of a liquid fuel and an evaporator to generate the gas fuel from the boosted liquid fuel.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Hereinafter, some preferred embodiments of the present invention will be described in detail with reference to the accompanying drawings.

Figure 1:
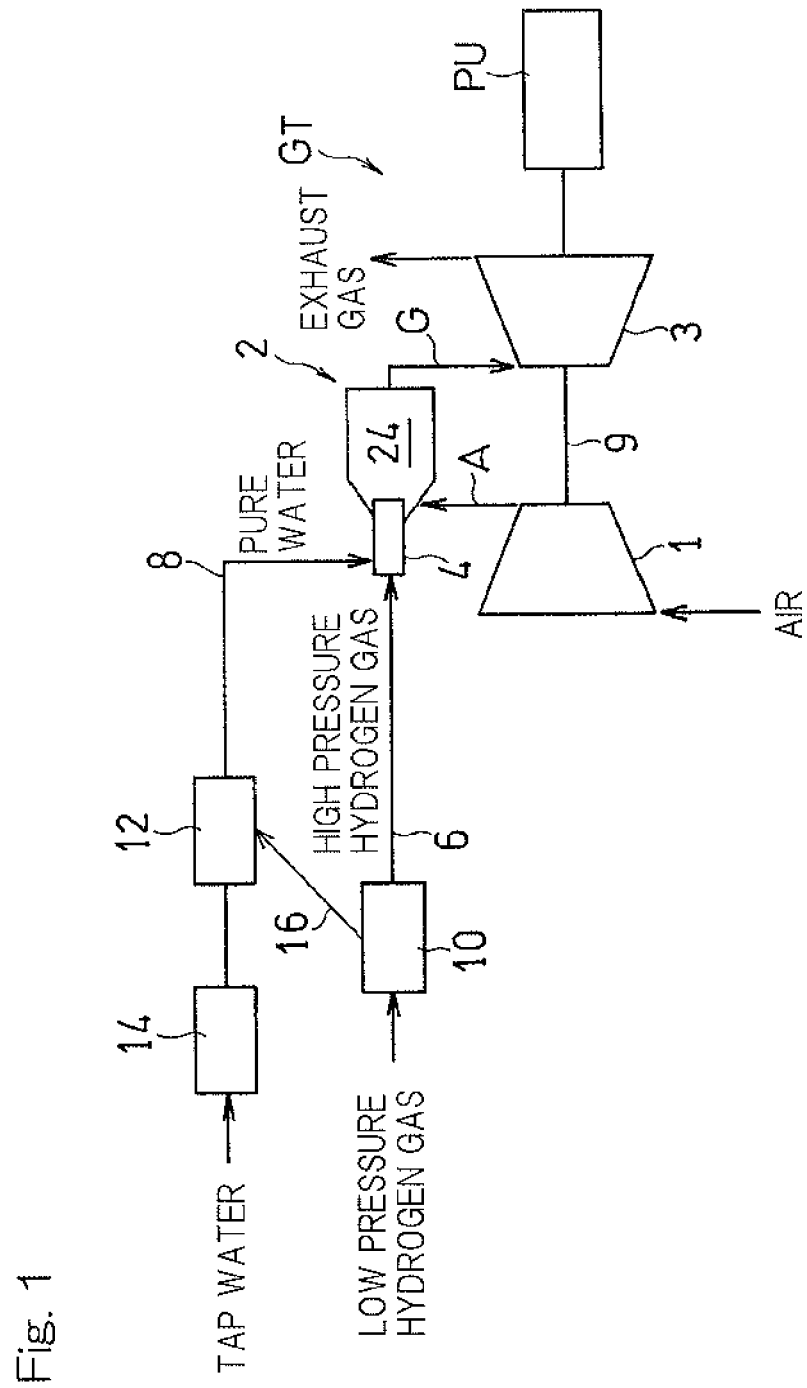
FIG. 1 is a schematic structural diagram showing a gas turbine system designed in accordance with a first preferred embodiment of the present invention.

In particular, FIG. 1 illustrates a schematic structure of a gas turbine system designed in accordance with a first preferred embodiment of the present invention. Referring to FIG. 1, a gas turbine engine GT includes, as major constituent components, a compressor 1, a combustor 2 and a turbine 3, and an electric power generator unit PU is connected with the gas turbine engine GT. The combustor 2 includes a fuel injection nozzle assembly 4, which is in turn fluid connected with a fuel supply passage 6 and an injection water introducing passage 8. The fuel supply passage 6 is a passage through which hydrogen gas H, which is a gas fuel, is supplied to the combustor 2, whereas the injection water introducing passage 8 is a passage through which a pure water W, i.e., an injection water is supplied to the combustor 2. The pure water W is supplied for the purpose of lowering the flame temperature within the combustor 2 to thereby lower the NOx emission.

A compressed air A, fed from the compressor 1, and a hydrogen gas H, fed from the fuel injection nozzle assembly 4, are burned within the combustor 2 to produce a high temperature, high pressure combustion gas G, which is in turn supplied to the turbine 3 to drive the latter. The compressor 1 referred to above is driven by the turbine 3 through a rotary shaft 9 so that a load such as the electric power generator unit PU may be driven by the turbine 3.

The fuel supply passage 6 is provided with a gas compressing device 10 which serves as a fuel boosting unit for boosting the pressure of the hydrogen gas H. This gas compressing device 10 is operable to boost the pressure of the hydrogen gas, which is low in pressure, to generate a high pressure hydrogen gas H, and the hydrogen gas H so boosted is supplied to the combustor 2 through the fuel injection nozzle assembly 4.

The injection water introducing passage 8 is provided with a reservoir 12 and a pure water making device 14. The pure water making device 14 makes the pure water W from tap water in any known manner utilizing an ion exchange resin or a reverse osmosis membrane, and the pure water W so made by the pure water making device 14 is pooled in the reservoir 12. The fuel supply passage 6 and the reservoir 12 are communicated with each other through a pressurizing passage 16 and, hence, the pure water W pooled in the reservoir 12 is pressurized by the hydrogen gas H then boosted in pressure by the gas compressing device 10 before the pure water W is supplied into the combustor 2 through the fuel injection nozzle assembly 4. In other words, the fuel injection nozzle assembly 4 supplied the hydrogen gas H and the pure water W into the combustor 2.

Figure 2:
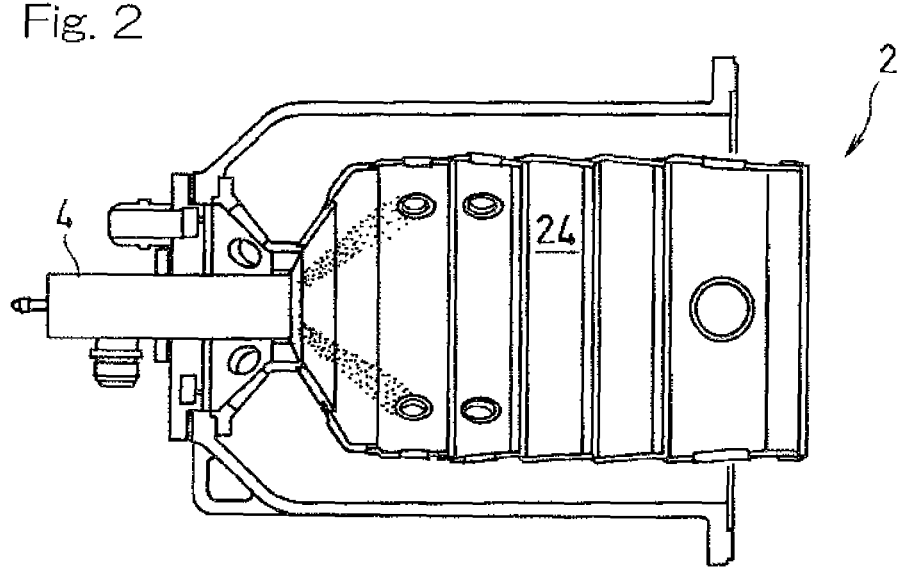
FIG. 2 is a longitudinal sectional view showing a combustor for a gas turbine engine employed in the gas turbine system.

As shown in FIG. 2, the combustor 2 is of a premixing type in which the hydrogen gas H and the pure water W are mixed together within the fuel injection nozzle assembly 4 before they are supplied therethrough into the combustor 2. Specifically, the fuel injection nozzle assembly 4 is of an internal mixing system for atomizing the pure water W by the effect of the flow (flow current) of the hydrogen gas H, and, after the hydrogen gas H and the pure water W have been premixed within the fuel injection nozzle 4, the resultant mixture is injected into a combustion chamber 24 of the combustor 2.

Figure 3:
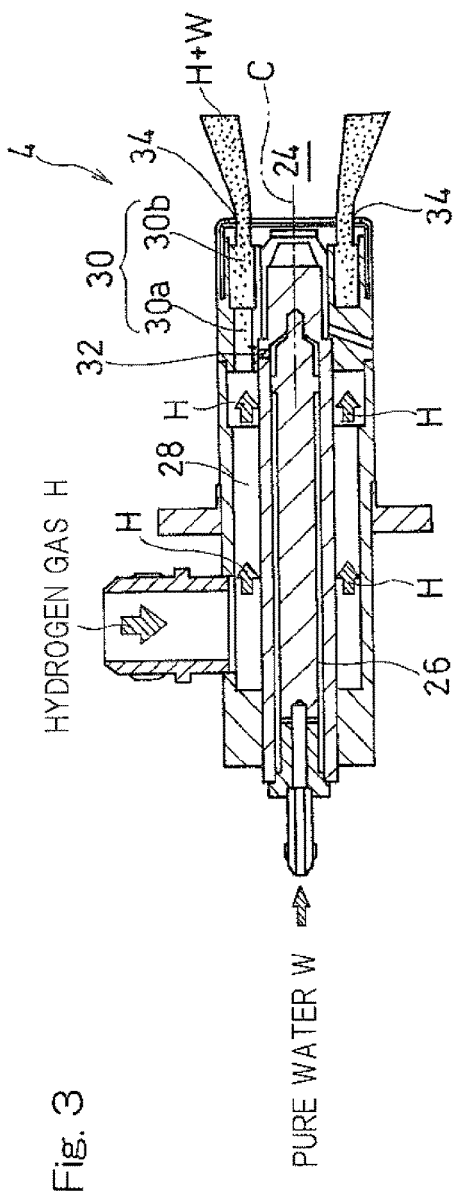
FIG. 3 is a longitudinal sectional view showing a fuel injection nozzle assembly employed in the combustor of FIG. 2.

As shown in FIG. 3, the fuel injection nozzle assembly 4 has an annular injection water passage 26, defined therein for the flow of the pure water W, and an annular gas fuel passage 28 also defined therein so as to surround radially outwardly a portion of the injection water passage 26. This gas fuel passage 28 has a downstream end, with respect to the direction of flow of the hydrogen gas towards the combustor 2, which downstream end is communicated with a mixing passage 30. The pure water W is injected into the mixing passage 30 from a radially outwardly oriented injection region 32 defined in a downstream end portion of the injection water passage 26, to allow the pure water W so injected to be atomized by the effect of the flow of the hydrogen gas H and then premixed with the hydrogen gas H.

The mixing passage 30 includes a throttling region 30a that form an upstream portion of the mixing passage 30 and an annular region 30b that forms a downstream portion of the mixing passage 30, and the throttling region 30a is comprised of a plurality of axial passageways which are circumferentially equidistantly spaced from each other about the longitudinal axis of the nozzle assembly 4. The radially outwardly oriented injection region 32 referred to above is facing each of the axial passages in the throttling region 30a. When the pure water W is injected into the flow of the hydrogen gas H then flowing at high speed within the throttling region 30a, the pure water W is effectively atomized and the resultant mixture of the hydrogen gas H and the pure water W is homogenized within the annular region 30b so as to have a circumferentially uniform distribution of concentration. The annular region 30b has a downstream end which is communicated with a plurality of injection holes 34 formed in the fuel injection nozzle assembly 4 so as to be circumferentially equidistantly spaced from each other, and the premix of the hydrogen gas H and the pure water W formed in the mixing passage 30 is eventually injected into the combustion chamber 24 through the injection holes 34. The number of the injection holes 34 employed is, for example, within the range of 8 to 12.

One example of the operation of the gas turbine system of the structure described hereinbefore will now be described.

At the outset, in the night during which the gas turbine engine GT is not operated, the pure water making device 14 shown in FIG. 1 is run by the use of an external electric power available in the night to make the pure water W of a quantity, which may be used in one day, and the pure water W so made is thereafter pooled in the reservoir 12.

Thereafter, in the daytime, the gas turbine engine GT is operated to provide an electric power. At this time, without the pure water making device 14 being operated, only the gas compressing device 10 is operated by the use of the external electric power. Upon and after the operation of the gas compressing device 10, a major portion of the high pressure hydrogen gas H boosted by the gas compressing device 10 in the manner hereinbefore discussed is supplied to the fuel injection nozzle assembly 4 through the fuel supply passage 6, and a portion thereof is guided into the reservoir 12 through the pressurizing passage 16. The pure water W pooled in the reservoir 12 during the night is pressurized by the high pressure hydrogen gas H, which has been introduced into the reservoir 12 through the pressurizing passage 16, and is then supplied to the fuel injection nozzle assembly 4 through the injection water introducing passage 8. The fuel injection nozzle assembly 4 premixes the supplied high pressure hydrogen gas H and pure water W together and then injects the resultant mixture into the combustor 2. The hydrogen gas H jetted into the combustor 2 is burned within the combustor 2 together with the compressed air A supplied from the compressor 1.

A series of verifying experiments were conducted on the gas turbine system of the first embodiment.

Figure 4:
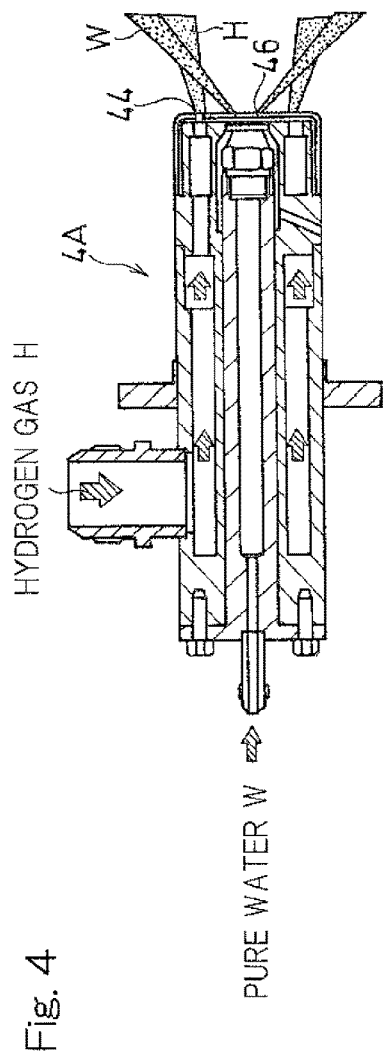
FIG. 4 is a longitudinal sectional view showing the fuel injection nozzle assembly employed in the combustor in a comparable example.

The gas turbine system used as a comparison example was of a structure generally similar to the above described gas turbine system of the first embodiment, but differs therefrom in that, in place of the reservoir 12 and the pressurizing passage 16 both employed in the practice of the foregoing embodiment, a water pressurizing device such as, for example, a high pressure pump was employed on one hand and, on the other hand, a fuel injection nozzle assembly 4A was of a pressure atomizer type as shown in FIG. 4, not of the internal mixing system. With the pressure atomizer type, the pure water W is, after having been boosted in pressure by a water pressurizing device (not shown), supplied to the injection nozzle assembly 4A and is subsequently jetted into the combustion chamber 24 through the plurality of injection holes 46, which were different from the plurality of injection holes 44 for the hydrogen gas H, to allow the pure water W to be mixed with the hydrogen gas H within the combustion chamber 24.

Figure 5:
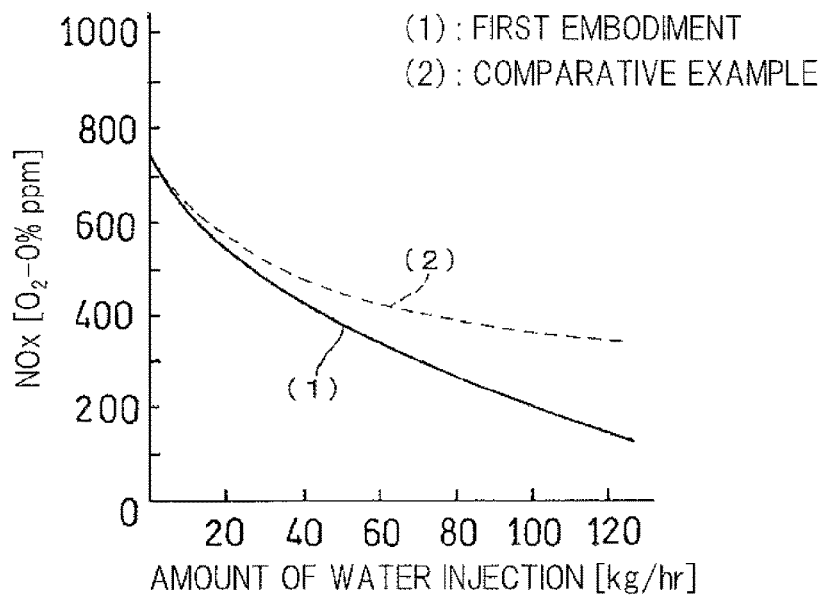
FIG. 5 is a chart showing the emissions of NOx component exhibited respectively by the gas turbine engine of the first embodiment and the conventional gas turbine engine.
Figure 6:
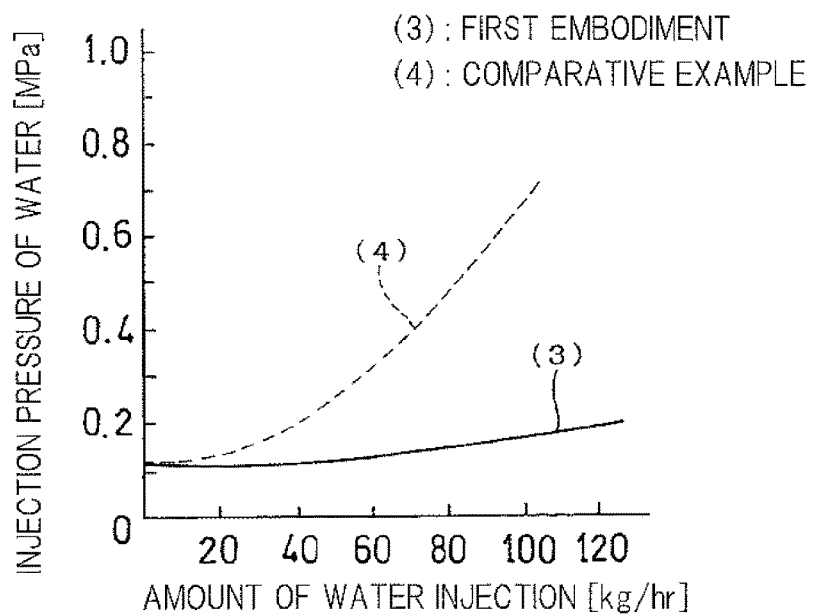
FIG. 6 is a chart showing the injection pressures of the injection water exhibited respectively by the gas turbine engine of the first embodiment and the conventional gas turbine engine.

FIG. 5 illustrates a chart showing the NOx emission versus the amount of the pure water injection and FIG. 6 illustrates a chart showing the injection pressure of the pure water W versus the amount of the pure water injection. As shown in FIG. 5, according to the gas turbine system of the structure described in connection with the foregoing embodiment, as the amount of the pure water injection increases, the NOx emission gradually lowers as compared with that exhibited by the gas turbine system according to the comparative example shown in FIG. 4, and the NOx emission exhibited by the gas turbine system of the first embodiment is half or smaller than that exhibited by the comparative example at 100 kg/hr. of the pure water injection amount.

Also, as shown in FIG. 6, in the gas turbine system according to the foregoing embodiment, even though the amount of the pure water injection increases, the injection pressure of the pure water does not increase so much and, when the amount of the pure water injection is in the vicinity of 100 kg/hr., the injection pressure of the pure water is one third or smaller than that exhibited by the gas turbine system according to the comparative example shown in FIG. 4.

In particular, the hydrogen gas H has an excellent flame holding capability, but is liable to a high NOx emission, because the combustion temperature is high as compared with the natural gas, and does also result in formation of flames in the vicinity of the fuel injection nozzle assembly 4 because of a high burning velocity. Because of that, with the combustor of the pressure atomizer type shown in FIG. 4, it is difficult to effectively mix the pure water W into the flames and, therefore, reduction of the NOx emission is difficult to achieve. Moreover, atomization of the pure water W within the combustion chamber 24 requires the pure water to be jetted under a high pressure.

In contrast thereto, with the combustor 2 of the premixing type shown in FIG. 3 and employed in the practice of the foregoing embodiment, the hydrogen gas H and the atomized pure water W can be sufficiently mixed together and, therefore, there is no need to inject the mixture into the combustion chamber 24 under a high pressure through the fuel injection nozzle assembly 4. Also, since the hydrogen gas H has a low density, the supply of a gas in a quantity equal to three to four times in volume ratio is needed in order to supply the same calorie of the natural gas and, as a result, the fluid velocity through the fuel injection nozzle assembly 4 shown in FIG. 3 is rendered to be three to four times. Accordingly, in the mixing passage 30 in the fuel injection nozzle assembly 4, the pure water W can be effectively atomized by the relatively high-speed flow of the hydrogen gas H and the premixing of the pure water W with the substantial amount of the hydrogen gas H can be accelerated.

In the construction described herein above, since using the boosted hydrogen gas G the pure water W within the reservoir 12 is pressurized, accessory equipments such as, for example, a device for pressurizing the pure water W and an electric power therefor are no longer needed. Therefore, the highly efficient reduction of the NOx emission can be realized while the system in its entirety, including the gas turbine engine GT, is simplified.

Also, as shown in FIG. 3, since the combustor 2 is of a premixing type in which the hydrogen gas H and the pure water W are premixed together, the injection pressure of the pure water W can be suppressed as compared with combustion with the pressure atomizer type, and the pressurization by the hydrogen gas H through the pressurizing passage 16 can be facilitated. As a result thereof, simplification of the accessory equipment as well as the high efficient reduction of the NOx can be easily realized.

In addition, since the flow of the hydrogen gas is rendered to be larger than that of the natural gas, the premixing with the pure water W by the effect of the fast flow of the hydrogen gas H is accelerated and, therefore, the reduction of the NOx emission can be realized by efficiently lowering the flame temperature with a small amount of the pure water W.

As discussed hereinbefore, since the amount of the pure water W used is minimized, it is possible that by making the pure water W during the night, in which the electric power consumption is low, with the use of the pure water making device 14 shown in FIG. 1, the pure water W in a quantity required in one day can be pooled within the reservoir 12. As a result, there is no need to operate the pure water making device 14 during the operation of the gas turbine engine GT, and therefore, the electric power consumption during the daytime can be suppressed and, yet, as compared with the combustor of the pressure atomizer type that requires the pure water to be continuously injected under a high pressure during the operation of the gas turbine engine G, the amount of the pure water W used can be saved and the highly efficient reduction of the NOx emission can be realized.

Figure 7:
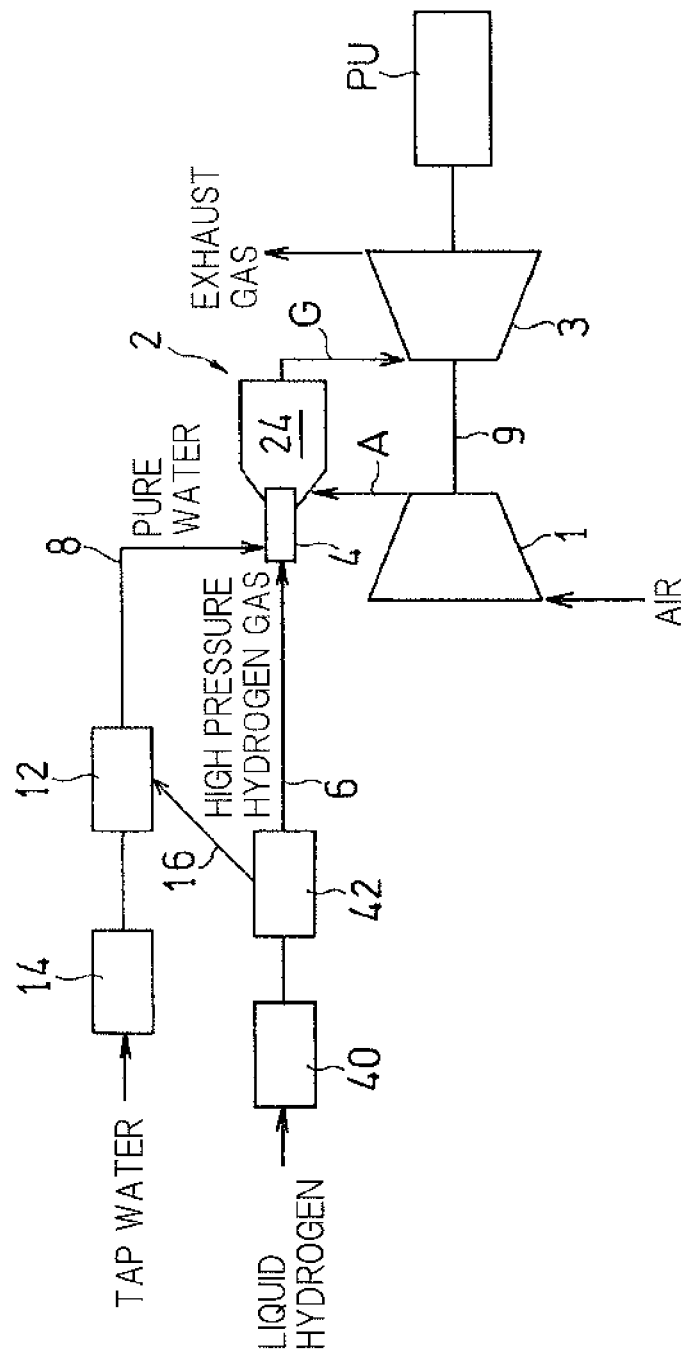
FIG. 7 is a schematic structural diagram showing the gas turbine system designed in accordance with a second preferred embodiment of the present invention.

The gas turbine system designed in accordance with a second preferred embodiment of the present invention is shown in FIG. 7. This second embodiment is substantially similar to the previously described first embodiment, but differs therefrom in that, instead of the use of the gas compressing device 10 employed in the practice of the previously described first embodiment for boosting the low pressure hydrogen gas, a liquid hydrogen compressing device 40, which is a fuel boosting unit, is employed to boost a liquid hydrogen to allow the high pressure hydrogen gas H to be produced in an evaporator 42. Other structural features than that described above are similar to those in the previously described first embodiment. Even in the practice of this second embodiment, effects similar to those afforded by the first embodiment can be equally obtained.

It is to be noted that the structure of the fuel injection nozzle assembly 4 employed in any one of the foregoing embodiments of the present invention may not be necessarily limited to that shown and described and may be of the mixing type such as shown in any one of FIGS. 8A and 8B to FIGS. 10A and 10B.

Figure 8A:
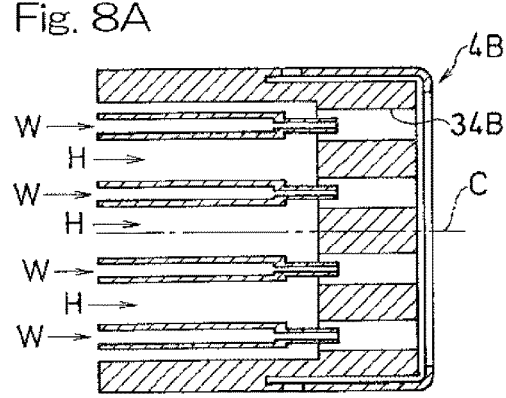
FIG. 8A is a longitudinal sectional view showing the fuel injection nozzle assembly of a different mixing type.
Figure 8B:
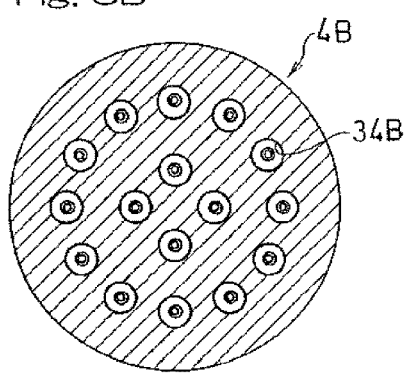
FIG. 8B is a front elevational view of the fuel injection nozzle assembly shown in FIG. 8A.

Specifically, FIGS. 8A and 8B illustrate the fuel injection nozzle assembly 4B of an external mixing system. In the fuel injection nozzle 4 of the internal mixing system shown in FIG. 3 it is so designed and so configured as to mix the gas fuel, such as the hydrogen gas H, and the injection water (pure water W) in the mixing passage 30 within the nozzle assembly 4. In contrast thereto, the fuel injection nozzle assembly 4B of the external mixing system shown in FIGS. 8A and 8B is so designed and so configured as to perform the mixing outside the nozzle assembly 4B, specifically so designed and so configured that, after the gas fuel H and the injection water W have been merged together, they can be jetted from injection holes 34B to the outside of the nozzle assembly 4B to allow them to be mixed together. The injection holes 34B are disposed in double circular rows coaxial with each other and, also, with the longitudinal axis C of the fuel injection nozzle assembly 4B.

Figure 9A:
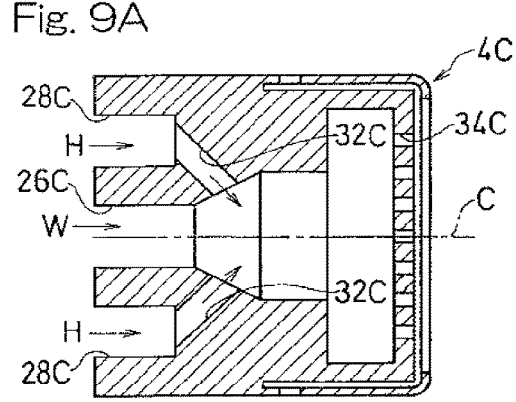
FIG. 9A is a longitudinal sectional view showing the fuel injection nozzle assembly of another different mixing type.
Figure 9B:
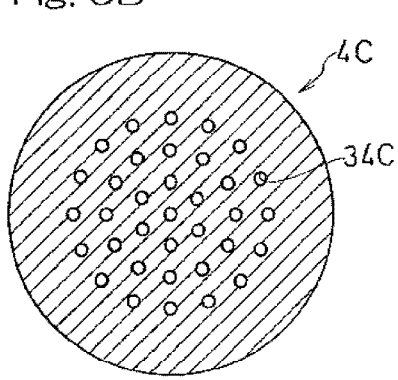
FIG. 9B is a front elevational view of the fuel injection nozzle assembly shown in FIG. 9A.

FIGS. 9A and 9B illustrate a fuel jetting nozzle assembly 4C of a Y-jet type injector. In the fuel injection nozzle assembly 4 of the internal mixing system shown in FIG. 3 it is so designed and so configured that the jetted injection water W is jetted in a radial direction from the radially outwardly oriented injection region 32, which is provided at the downstream end portion of the injection water passage 26 to allow the gas fuel H and the injection water W to be mixed together. In contrast thereto, the fuel injection nozzle assembly 4C of the Y-jet type injector shown in FIGS. 9A and 9B is so designed and so configured that an injection region 32C, which is gradually inclined radially inwardly towards a downstream side, is provided at a downstream end of an annular gas fuel passage 28C. The injection region 32C referred to above is in a plural number and arranged in a circumferential direction and, when the gas fuel H is injected from this injection region 32C in a slantwise direction, the gas fuel H can be mixed with the injection water W then inflowing from the injection water passage 26C at a center portion, and the resultant mixture is subsequently injected from injection holes 34C. The injection holes 34C referred to above are disposed in triple circular rows coaxial with each other and, also, with the longitudinal axis C of the fuel injection nozzle assembly 4C.

Figure 10A:
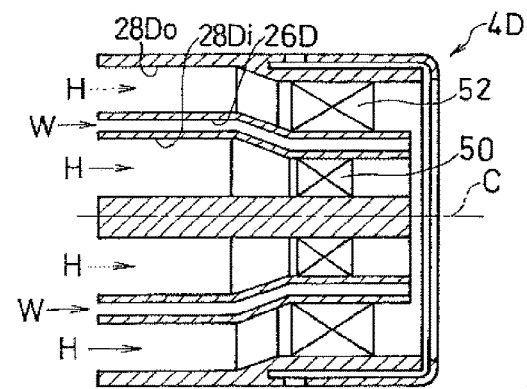
FIG. 10A is a longitudinal sectional view showing the fuel injection nozzle assembly of a yet different mixing type.
Figure 10B:
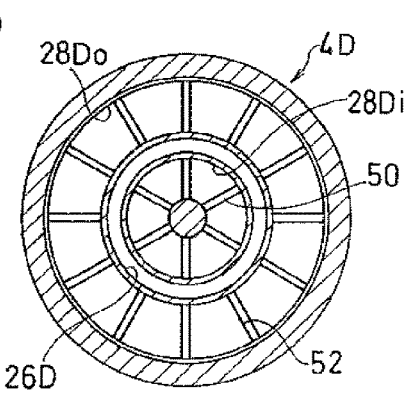
FIG. 10B is a front elevational view of the fuel injection nozzle assembly shown in FIG. 10A.

FIGS. 10A and 10B illustrate the fuel injection nozzle assembly 4D of a gas blast atomizing system. The illustrated fuel injection nozzle 4D is provided with an annular inner gas fuel passage 28Di and an annular outer gas fuel passage 28Do, which are positioned radially inwardly and outwardly of an annular injection water passage 26D, and also is provided with swirlers 50 and 52 at respective downstream portions of the inner and outer gas fuel passages 28Di and 28Do. In a condition in which the gas fuel H then flowing through the inner and outer gas fuel passages 28Di and 28Do is swirled by the swirlers 50 and 52, the gas fuel H is mixed with an injection water W in the form of thin annular layer to provide the atomized mixture at the outside of the fuel injection nozzle assembly 4D.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Compressor
2 . . . Combustor
3 . . . Turbine
4 . . . Fuel injection nozzle assembly
6 . . . Fuel supply passage
10 . . . Gas compressing device (Fuel boosting unit)
12 . . . Reservoir
14 . . . Pure water making device
16 . . . Pressurizing passage
40 . . . Liquid hydrogen compressing device (Fuel boosting unit)
42 . . . Evaporator (Fuel boosting unit)
GT . . . Gas turbine engine
H . . . Hydrogen gas (Gas fuel)
W . . . Pure water (Injection water)

What is claimed is:
1. A gas turbine system which comprises:
a combustor, haying a fuel injection nozzle assembly to inject a gas fuel and an injection water;
a reservoir to pool the injection water to be supplied to the combustor;
a fuel boosting unit to increase the pressure of the gas fuel to be supplied to the combustor;

a fuel supply passage to supply the gas fuel boosted by the fuel boosting unit into the combustor;

a pressurizing passage communicating with the reservoir and the fuel supply passage to increase the pressure of the injection water by the aid of the boosted gas fuel; and an injection water introducing passage to connect the combustor with the reservoir, the injection water introducing passage supplying the injection water to the combustor, wherein the gas fuel and the injection water are separately supplied to the fuel injection nozzle assembly of the combustor.

2. The gas turbine system as claimed in claim 1, in which the combustor is of a premixing type in which the gas fuel and the injection water are premixed.

3. The gas turbine system as claimed in claim 2, in which the gas fuel comprises a hydrogen gas.

4. The gas turbine system as claimed in claim 1, further comprising a pure water making device to manufacture the injection water in the form of a pure water.

5. The gas turbine system as claimed in claim 1, in which the fuel boosting unit comprises a gas compressing device.

\* \* \* \* \*